US012671361B2

(12) United States Patent
Kamata

(10) Patent No.: US 12,671,361 B2
(45) Date of Patent: Jun. 30, 2026

(54) SOLAR MODULE

(71) Applicants: CLEAN ENERGY FACTORY CO., LTD., Nemuro (JP); MERS FORS CO., LTD., Tokyo (JP)

(72) Inventor: Hiroyuki Kamata, Tokyo (JP)

(73) Assignees: CLEAN ENERGY FACTORY CO., LTD., Nemuro (JP); MERS FORS CO., LTD., Tokyo (JP)

( * ) Notice: Subject to any disclaimer, the term of this patent is extended or adjusted under 35 U.S.C. 154(b) by 434 days.

(21) Appl. No.: 17/761,375

(22) PCT Filed: Sep. 15, 2020

(86) PCT No.: PCT/JP2020/034816
§ 371 (c)(1),
(2) Date: Mar. 17, 2022

(87) PCT Pub. No.: WO2021/054305
PCT Pub. Date: Mar. 25, 2021

(65) Prior Publication Data
US 2023/0353087 A1 Nov. 2, 2023

(30) Foreign Application Priority Data
Sep. 18, 2019 (JP) .................................. 2019-169570

(51) Int. Cl.
*H02S 40/36* (2014.01)
*H02S 50/00* (2014.01)
(52) U.S. Cl.
CPC .............. *H02S 40/36* (2014.12); *H02S 50/00* (2013.01)

(58) Field of Classification Search
CPC ................................. H02S 40/36; H02S 50/00
See application file for complete search history.

(56) References Cited

U.S. PATENT DOCUMENTS

| 2009/0014057 A1 * | 1/2009 | Croft ...................... H02S 50/00 |
| | | 136/246 |
| 2010/0198424 A1 * | 8/2010 | Takehara .......... H01L 31/02021 |
| | | 700/297 |

(Continued)

FOREIGN PATENT DOCUMENTS

| CN | 105509728 A | * 4/2016 | ........... G01C 21/005 |
| JP | H09-018046 A | 1/1997 | |

(Continued)

OTHER PUBLICATIONS

English machine translation of KR10-1525237 (Year: 2023).*

(Continued)

*Primary Examiner* — Angelo Trivisonno
(74) *Attorney, Agent, or Firm* — HAUPTMAN HAM, LLP

(57) ABSTRACT

To provide a solar module enabling prevention of a large decrease in power generation efficiency by decoupling only a cell group where an in-module failure has occurred. A solar module in which a plurality of solar cell groups, each including a plurality of solar cells, is arranged and connected via an in-module parallel connection line, wherein the solar cell groups each include a cell group controller that monitors a power generation state of the solar cells in the solar cell group and that has a switch for decoupling the solar cell group from the in-module parallel connection line upon detection of a power generation amount falling below a preset value.

2 Claims, 11 Drawing Sheets

SHADOW OF SHIELDING OBJECTS
INCIDENT ANGLE (φ)
LOCATION DATA (L)
GPS
SUNSET TIME
SUNRISE TIME
11
10
12
N
W
E
S
INSTALLATION ANGLE (D)
35
36
INSTALLATION DIRECTION (S)

(56)        References Cited

U.S. PATENT DOCUMENTS

| | | | |
|---|---|---|---|
| 2010/0219983 A1* | 9/2010 | Peleg .................... | G01K 13/00 |
| | | | 340/870.16 |
| 2012/0068547 A1 | 3/2012 | Vermeersch et al. | |
| 2012/0080955 A1 | 4/2012 | Fishman et al. | |
| 2014/0196761 A1 | 7/2014 | Tilley et al. | |
| 2017/0279402 A1* | 9/2017 | Schmaelzle ......... | H01L 31/0488 |
| 2018/0219394 A1 | 8/2018 | Tomita et al. | |

FOREIGN PATENT DOCUMENTS

| | | | | |
|---|---|---|---|---|
| JP | 2006-101581 A | 4/2006 | | |
| JP | 2011-103416 A | 5/2011 | | |
| JP | 2011-170836 A | 9/2011 | | |
| JP | 2012-513186 A | 6/2012 | | |
| JP | 2013-541930 A | 11/2013 | | |
| JP | 2018-124166 A | 8/2018 | | |
| JP | 2019-022326 A | 2/2019 | | |
| KR | 10-1525237 | * 6/2015 | ............. | H02S 50/00 |

OTHER PUBLICATIONS

English machine translation of DAI (CN 105509728 A). (Year: 2024).*
PCT/ISA/210, "International Search Report for PCT International Application No. PCT/JP2020/034816," Dec. 1, 2020.

\* cited by examiner

[Figure 1]
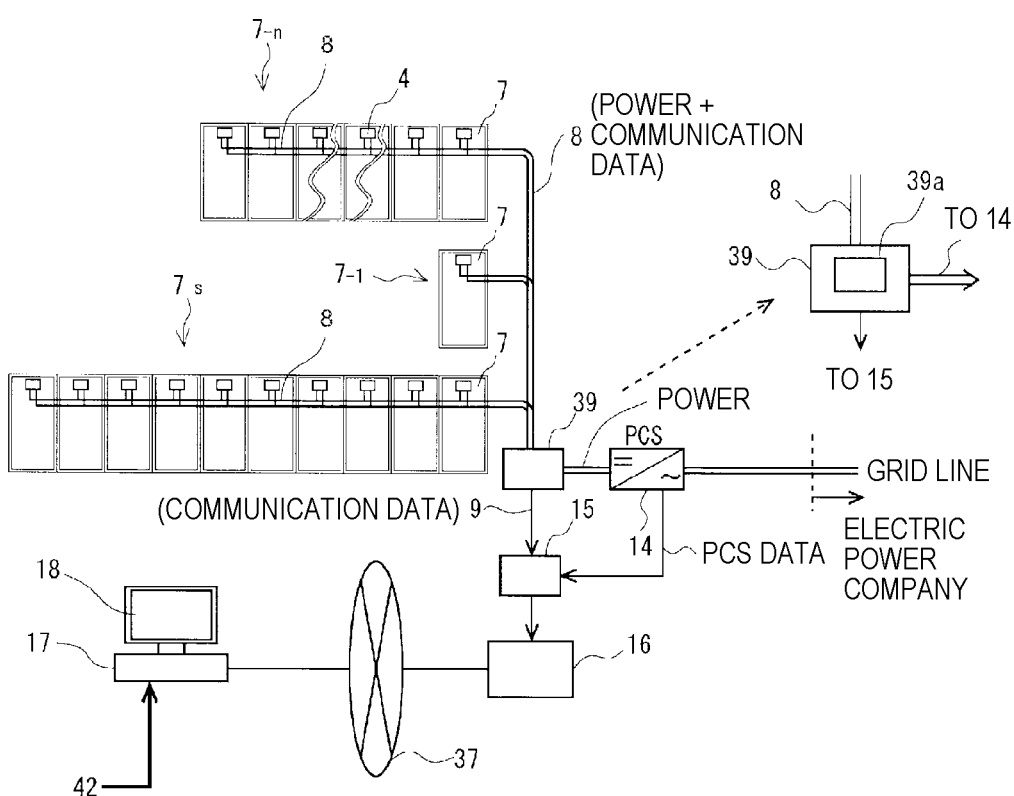

[Figure 2]
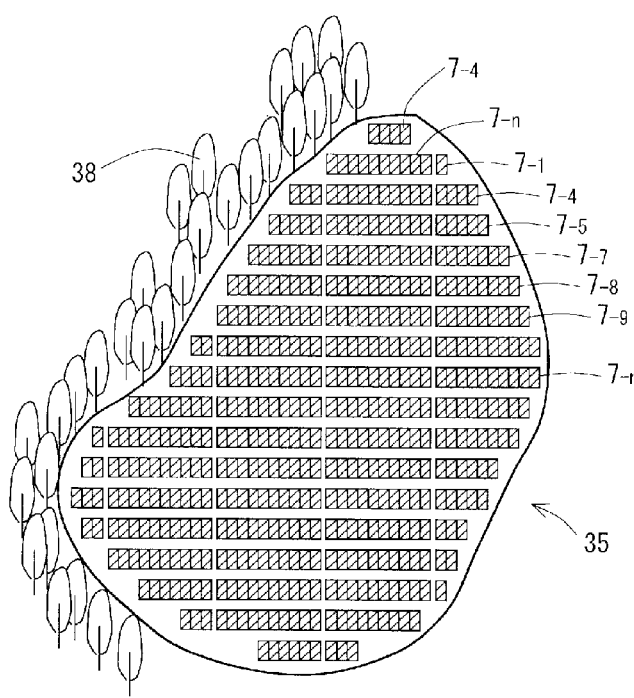
[Figure 3]
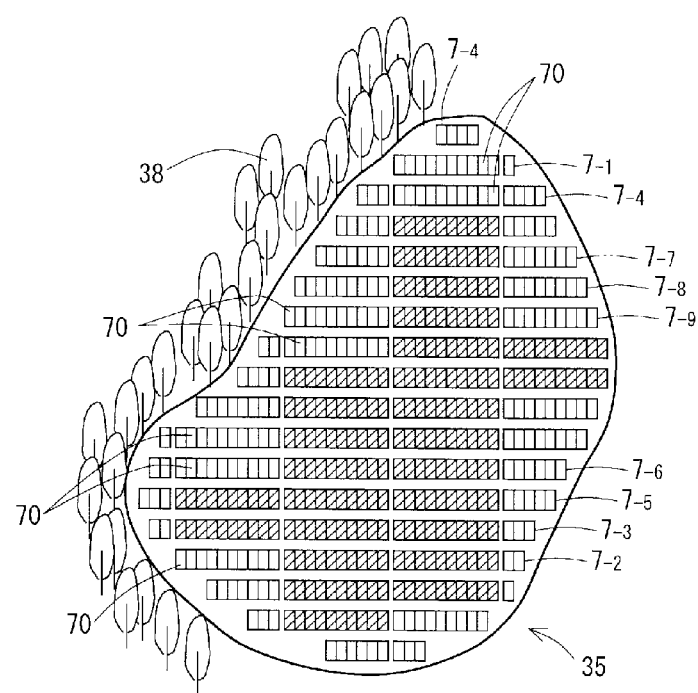

[Figure 4]
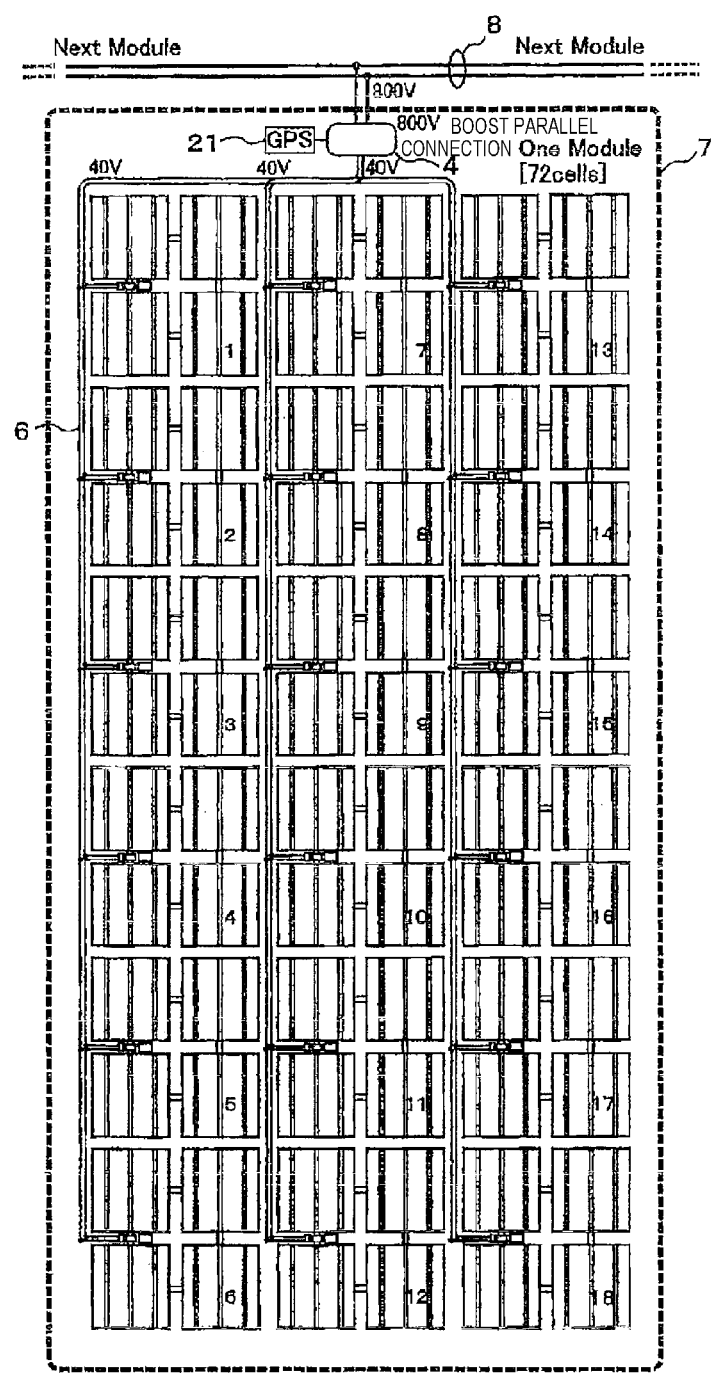

[Figure 5]
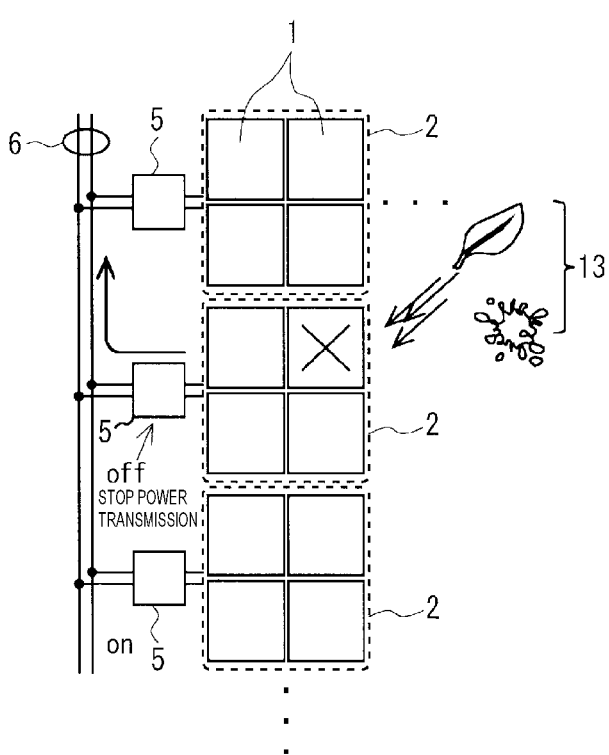

[Figure 6]
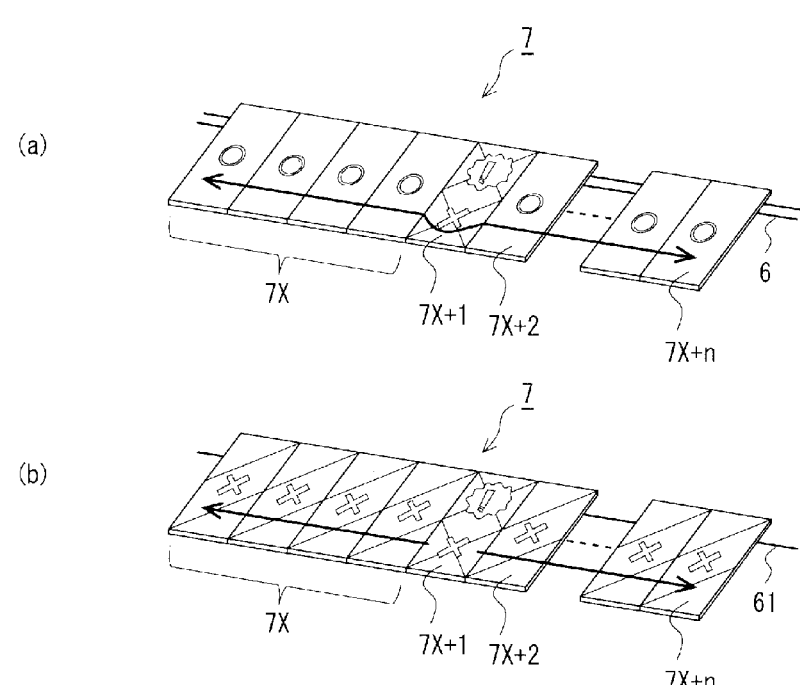
[Figure 7]
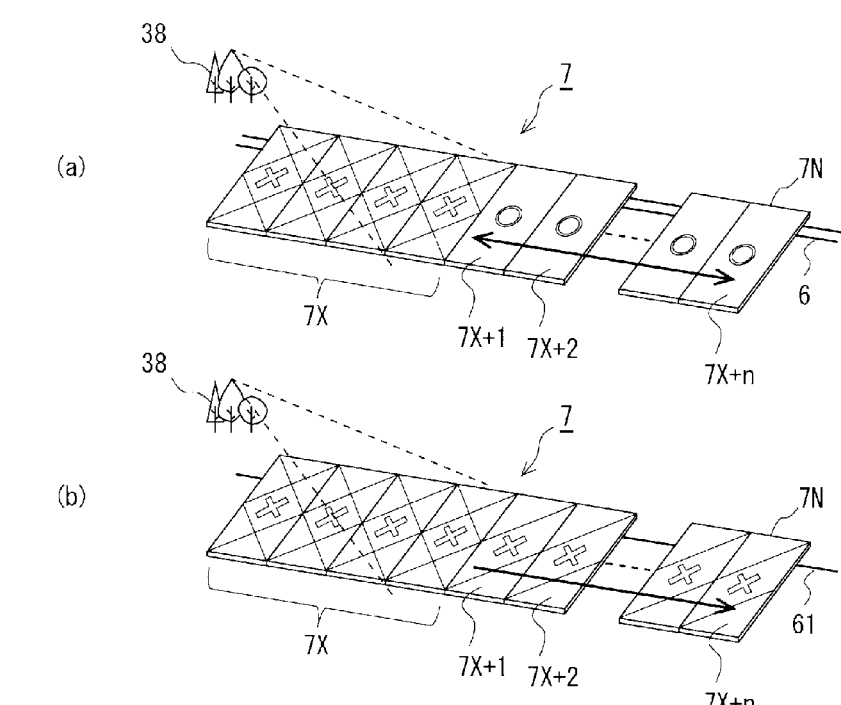

[Figure 8]
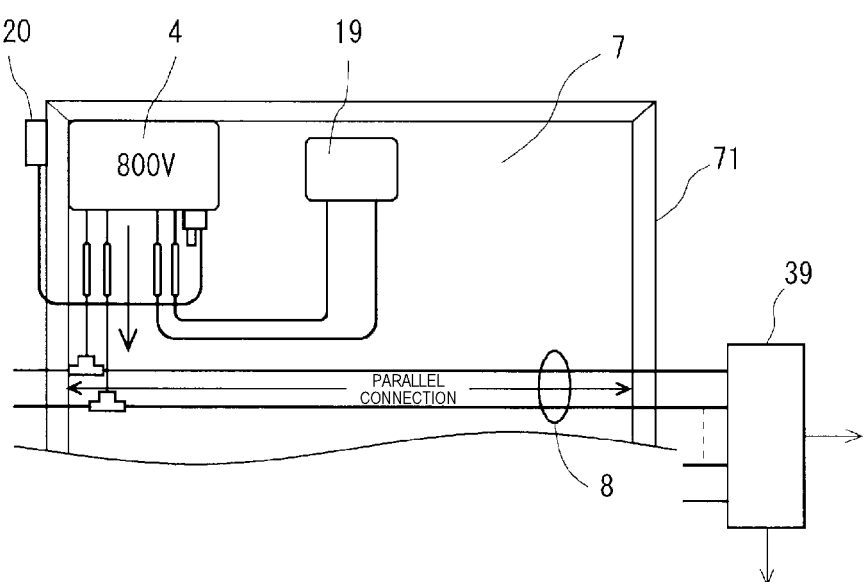
[Figure 9]
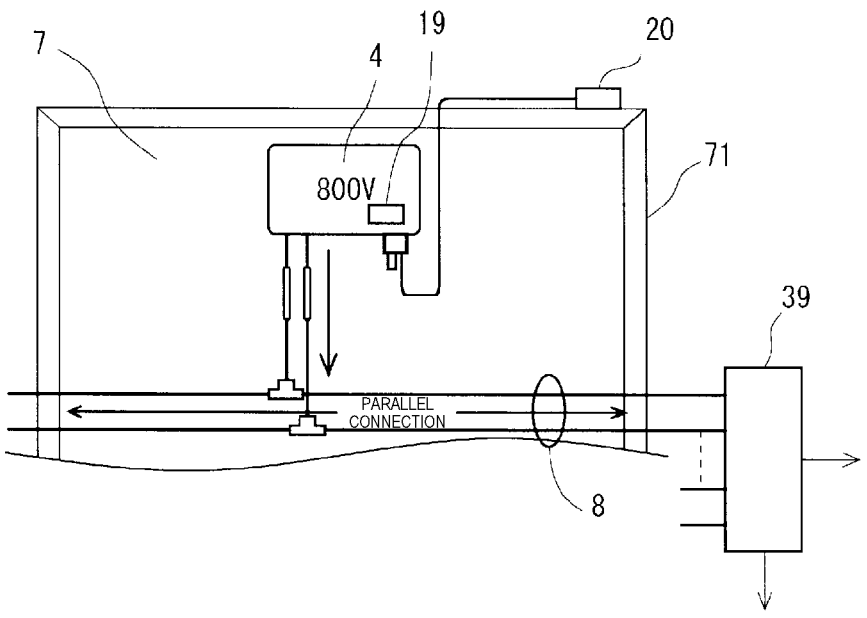

[Figure 10]
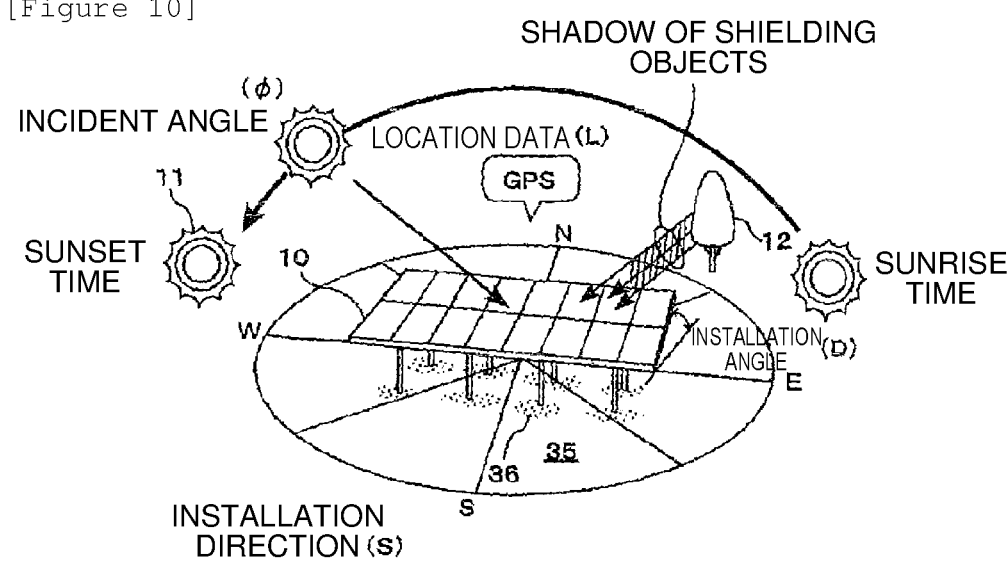
SHADOW OF SHIELDING OBJECTS
INCIDENT ANGLE (φ)
LOCATION DATA (L)
GPS
SUNSET TIME
SUNRISE TIME
INSTALLATION ANGLE (D)
INSTALLATION DIRECTION (s)

[Figure 11]
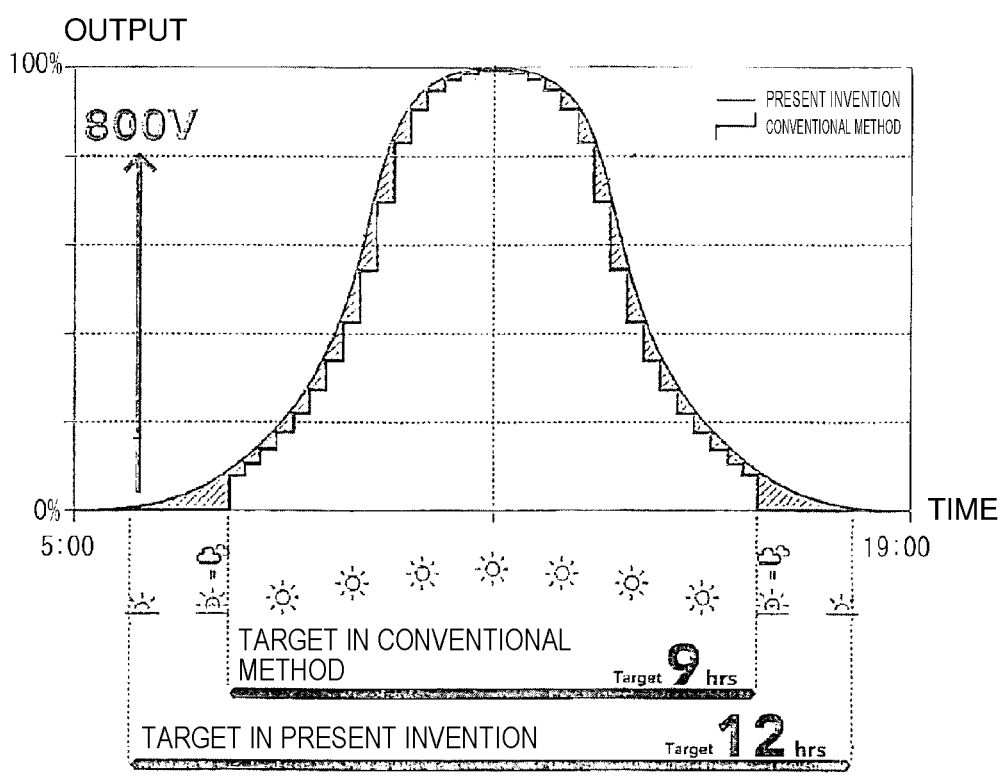

[Figure 12]
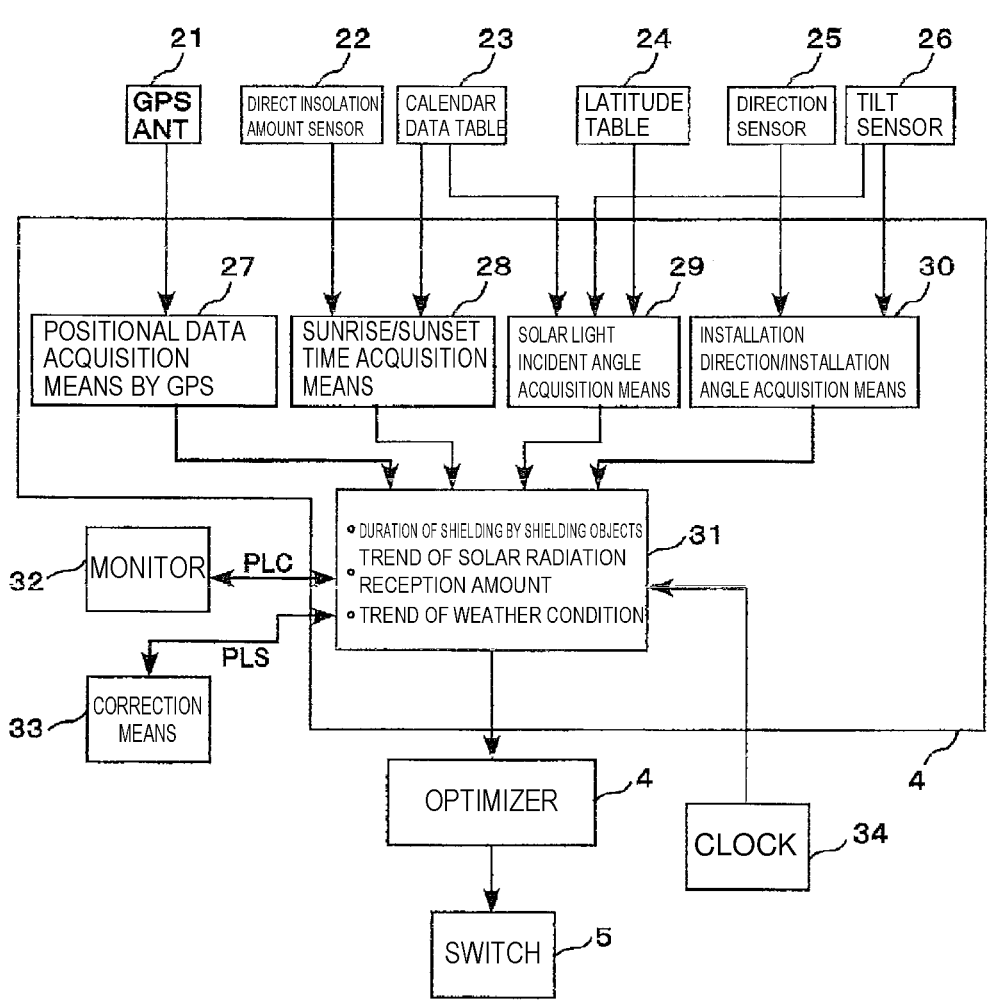

[Figure 13]
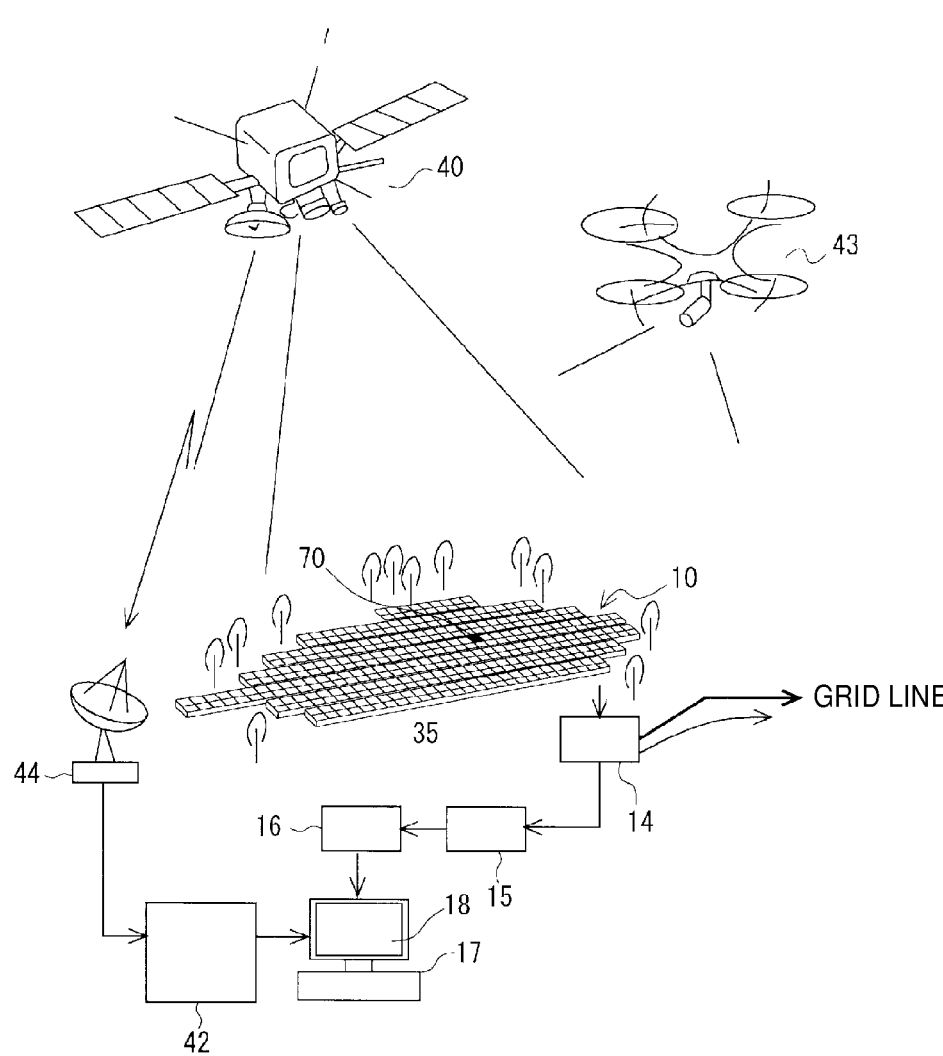

[Figure 14]
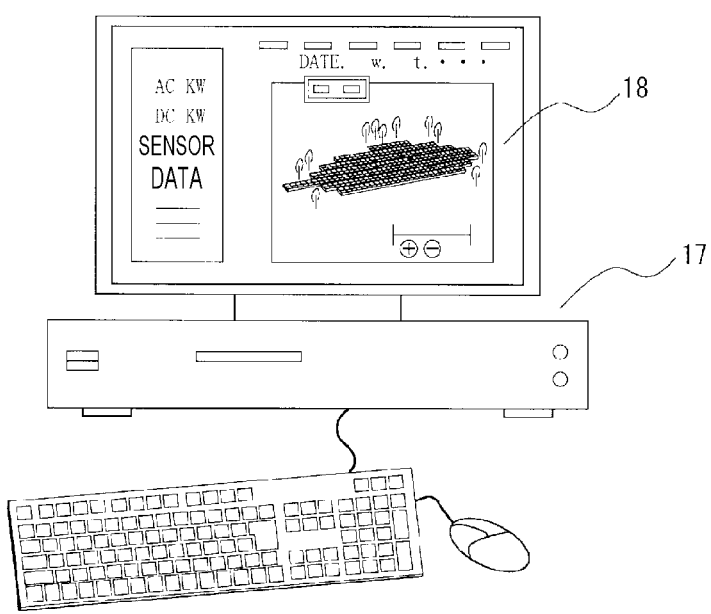

SOLAR MODULE

RELATED APPLICATIONS

The present application is National Phase of International Application No. PCT/JP2020/034816 filed Sep. 15, 2020, and claims priority from Japanese Application No. 2019-169570, filed Sep. 18, 2019, the disclosure of which is hereby incorporated by reference herein in its entirety.

TECHNICAL FIELD

The present invention relates to photovoltaic generation, and in particular to a solar module that enables effective utilization of a terrain in construction of a large-scale power generation site also referred to as a mega solar power plant.

BACKGROUND ART

As important means for decarbonization through leveraging renewable energy, various methods have been proposed, several of which have been put into practical applications as commercial facilities. Of these, solar power generation using solar light as an energy source and wind power generation using wind energy are prospective.

A large-scale solar power generation plant with more than 1,000 kW is also referred to as a mega solar power plant, and new installation of mega solar power plants is as active as wind power generation. Hereinafter, solar power generation is referred to as PV (Photo-Voltaic), a unit solar panel (element) used therefor is referred to as a PV cell (also referred to as a solar cell, or simply a cell), a group of one or a plurality of cells (e.g., four cells) is referred to as a solar cell group (also simply referred to as a cell group), a plurality of solar cell groups (e.g., ten or more groups) fixed on a frame and assembled as a construction standard is referred to as a solar module (also simply referred to as a module), and a large number of modules arranged in sequence in an area in the power generation site is referred to as a solar array.

Output of the PV cell varies according to an amount of received light. Particularly when the light level is low with a small amount of received light such as upon sunrise and sunset, output is low and internal impedance is high. Connecting a load when the internal impedance is high lowers voltage and inhibits normal operation as a power source, resulting in an unstable power source. Control enabling the stable operation even when the PV panel is in a low light level state is required. Such control is referred to as optimization, and optimizing means (circuit) is referred to as an optimizer.

Note that, in regard to this kind of prior art, Patent Literature 1, Patent Literature 2, Patent Literature 3, Patent Literature 4 and the like may be exemplified. Patent Literature 1, Patent Literature 2, and Patent Literature 3 disclose the prior arts related to the optimizing means, and Patent Literature 4 discloses a relationship between a solar panel and a received light amount.

CITATION LIST

Patent Literature

Patent Literature 1: Japanese Patent Laid-Open No. 2006-101581
Patent Literature 2: Japanese Patent Laid-Open No. 2011-170836

Patent Literature 3: Japanese Patent Laid-Open No. 2013-541930
Patent Literature 4: Japanese Patent Laid-Open No. 9-018046

SUMMARY OF INVENTION

Technical Problem

Not only power generation sites referred to as a mega solar power plant but also power generation sites with a certain scale of power generation are often installed in areas that have been developed from non-cultivated land such as a mountain area, idle farmland, or the like, namely an area on terrain with a light-shielding objects such as undulation and trees. In particular, installation in a mountain area often involves geography with a non-uniform solar light reception condition, or terrain surrounded by trees, and rarely involves flat land with no object shielding solar light. Also upon installation of a large number of solar modules on a roof or the like of a large factory or facility, it is required to consider environmental conditions similar to the above.

A top view shape of an area of the power generation site seen from above (planar shape of an installation surface of solar modules) is often indefinite. It is required to construct a power generation site that can efficiency utilize terrain by installing more solar modules on terrain of such an indefinite shape, and terrain or an installation surface (roof, wall surface, etc. of a building) with undulation, unevenness, or a slope.

In construction of the existing power generation site, in particular a mega solar power plant, the site is configured by installing a defined plurality of modules grouped into one unit by a frame, a so-called "string", on a cradle. The string is a construction unit in which 10 to 20 modules are integrally fixed.

The modules constituting the string are connected in series with each other and configured to supply generated power to the inter-module connection line. Consequently, when one module in the string fails, generated power from the entire string becomes unavailable.

An objective of the present invention is to provide a solar module that, even when a module in a string fails, keeps available generated power from normal modules constituting the string.

Solution to Problem

In order to achieve the above-described objective, the present invention is a solar module (7) in which a plurality of solar cell groups (2), each including a plurality of solar cells, are arranged and connected via an in-module parallel connection line, characterized by the following configuration. Hereinafter, for the sake of understanding of the present invention, reference symbols used in the description of configurations in the Example presented later, are attached.

(1) The present invention is characterized in that the solar cell groups (2) each include a cell group controller (5) that monitors a power generation state of the solar cells in the solar cell group and that has a switch for decoupling the cell group from the in-module parallel connection line (6) upon detection of a power generation amount falling below a preset value. As used herein, "decoupling" means that a power generation system to which the present invention is applied ignores or leaves as is the cell group, and does not mean proactive electrical interruption.

Therefore, the "switch" is not necessarily physical interruption means, and is only required to be means having a function of inhibiting the generated power of cell groups other than the failed cell group or of other solar modules from flowing in.

When the failure of the decoupled cell group is resolved or alleviated and thus the power generation amount exceeds the predetermined value, the generated power is output to the in-solar module parallel connection line (6) through the switch.

(2) The present invention is characterized in that each of the solar modules (7) includes an optimizer (4) including a boost circuit that boosts generated voltage being input from the solar cell group (2) via the in-module parallel connection line (6) and outputs to an inter-module parallel connection line (8).

(3) The present invention is characterized in that the optimizer (4) includes a cell group controller (5) that monitors a power generation state of the solar module (7) and that has a switch for decoupling output of the in-module parallel connection line (6) thereof from the inter-module parallel connection line (8) upon detection of a power generation amount falling below a preset value.

(4) The present invention is characterized in that the solar module (7) includes, in addition to a GPS antenna (21), a direct solar radiation reception amount sensor (22) which is an illuminance sensor, a calendar data table (23), a latitude table (24), a direction sensor (25), and a tilt sensor (26), an environmental sensor including a temperature sensor, a humidity sensor, a wind direction/wind force sensor, an atmospheric pressure sensor, and a vibration sensor, and carries out transmission and reception of information of monitoring and control by the cell group controller (5) of a status of the power generation site on the basis of obtained data of the various sensors and the like, to and from a monitoring center via the inter-solar module parallel connection line (8) and a relay terminal.

Note that the present invention is not limited to the above-described configuration and the configuration of Example described later, and it is obvious that various modifications can be made within the scope of the technical spirit of the present invention.

Advantageous Effects of Invention

According to the invention, degradation in power generation performance can be minimized by monitoring the power generation site, decoupling a cell group determined to be failed from a module, decoupling a module from a module set, and the like.

An address of a module laid in a field is also linked to a satellite image or a drone-captured image, and/or a drawing to enable identification of a module on a monitor in a monitoring site through, for example, detection of temperature change of the module. This enables prompt maintenance.

A terminal in the monitoring site is provided with a program that displays operation statuses of all modules in the power generation site to be managed in an appropriate display mode, to display on a monitor an operation history, a current status, a prediction and the like of a power generation amount of each module of the power generation site. This enables visual recognition of effective management of the power generation site and a prompt and accurate response. For example, notification of a specific module with a reduced power generation amount is made by displaying in red, blinking, or the like.

BRIEF DESCRIPTION OF DRAWINGS

FIGS. 1(*a*) and 1(*b*) are schematic views illustrating a configuration of solar modules constituting a power generation site and a management system according to the present invention.

FIG. 2 is an explanatory view of an example of terrain of the power generation site in which solar modules are laid, according to the present invention.

FIG. 3 is an explanatory view of a state in which the solar modules are laid by the conventional method in the example of terrain of the power generation site shown in FIG. 2.

FIG. 4 is a schematic view illustrating a configuration example of a solar module according to the present invention.

FIG. 5 is a schematic view illustrating solar cell groups constituting the solar module shown in FIG. 4.

FIGS. 6(*a*) and 6(*b*) are schematic views illustrating difference of decoupling methods of the solar modules constituting a solar array in a case of an in-module failure, through comparison between the present invention and the prior art.

FIGS. 7(*a*) and 7(*b*) are schematic views illustrating difference of decoupling methods of the solar modules constituting the solar array in a case of reduction in reception amount of solar light, through comparison between the present invention and the prior art.

FIG. 8 is a back view of a major part illustrating an attachment example of an optimizer in the solar module according to the present invention.

FIG. 9 is a back view of a major part illustrating another attachment example of the optimizer in the solar module according to the present invention.

FIG. 10 is an explanatory view of an example of solar light reception mode with respect to the solar modules.

FIG. 11 is a diagram illustrating change in output of the solar modules during a day through comparison between the present invention and the prior art.

FIG. 12 is a block diagram illustrating a configuration example with regard to the optimizer of the solar module according to the present invention.

FIG. 13 is a schematic view illustrating an entire image of an example of a monitoring system of the power generation site according to the present invention.

FIG. 14 is a schematic view illustrating an image of a monitoring monitor terminal in an example of the monitoring system of the power generation site according to the present invention.

DESCRIPTION OF EMBODIMENT

Hereinafter, an embodiment of the present invention is described in detail with reference to the drawings of Example.

EXAMPLE

FIGS. 1(*a*) and 1(*b*) are schematic views illustrating a configuration of solar modules constituting a power generation site and a management system according to the present invention, being an explanatory view of types of solar modules used for construction of the power generation site and a monitoring system. Note that, hereinafter, the term "solar" may be omitted and the solar module may be simply referred to as a "module", the solar cell may be simply referred to as a "cell", the solar module set may be simply referred to as a "module set", and the like. In addition, the terms "solar", "sun", and "solar light" may be used interchangeably.

FIGS. 1(a) and 1(b) show only three types of solar modules $7_{-1}$, $7_{-S}$, and $7_n$; however, $7_n$ includes $7_{-2}$ to $7_{-(S-1)}$. In addition, although the present Example assumes that S is 10 as a module number of construction standard and n is 2 to 9, n may also be S+1, S+2, . . . and the like.

In the drawings, reference numeral 7 denotes a single solar module (one module), reference numeral 4 denotes an optimizer, reference numeral 6 denotes an in-module parallel connection line (module generated power output conveyance communication line), reference numeral 8 denotes an inter-module parallel connection line (generated power output conveyance communication line of a plurality of modules).

Then, a monitoring/measurement/control signal of each module transmitted from the optimizer 4 is multiplexed as a multiplex signal on a power line via an PLC (power line communication) line using the inter-module parallel connection line 8, and is output with power. The generated power output lines 8 of a plurality of modules are concentrated in a junction box 39, and power is output to a grid line and the signal is output to a relay terminal 15 respectively, by a risk installed in the junction box 39 that separates the power and the signal.

Reference numeral 9 denotes a signal path for transferring the monitoring/measurement/control signal from each module to the relay terminal 15 in the power generation site, being PLC data multiplexed on the inter-module parallel connection line 8, shown as a transmission path in the drawing. In the present Example, communication between: the solar cell group and the solar module; and the relay terminal (monitoring terminal in the site) 15 in the power generation site and the monitoring site is transmitted via a power line.

In addition, a server 16 of the power generation site is transmitted to the remote terminal 17 via a public network such as Internet 37 and processed by various data processing programs installed on the remote terminal. A processing result is displayed on a monitor 18. Furthermore, the remote terminal 17 is configured to be capable of communicating with a power conditioner 14 via the relay terminal 15.

FIG. 2 is a plan view (top view two-dimensional shape) illustrating an example of a field (terrain of land and the like on which a cradle is to be installed) of the power generation site in which solar modules are laid, according to the present invention. FIG. 3 shows a state in which the solar modules are laid by the conventional method in the example of field terrain of the power generation site shown in FIG. 2. Reference numeral 35 in FIG. 2 shows the field of the power generation site. The field 35 has an indefinite shaped plan view, with shielding objects 38, represented by trees, being present in the circumference thereof.

In the present Example, the maximum number of the standard module sets 7-*n* are installed in a region in the vicinity of a central portion of the field 35 where a solar light reception condition is favorable.

Installation using a so-called "string" including the conventional fixed number of modules shown in FIG. 3 (10 modules in this case similar to FIG. 2) results in a state shown by hatching in FIG. 3. The "string" is something like the module set of the present Example as a concept, but these are different in function. Non-hatched spaces indicate spaces where the "string" can be installed.

Note that an area in FIG. 3 where no string is installed in spite of a space corresponding to one string (non-hatched area) indicates a space (reference numeral 70) where installation of a string hardly contributes to efficiency of power generation as a whole due to the presence of the shielding objects 38 and the like suppressing a power generation amount.

In addition, in the string configuration, the number of modules satisfying voltage required for power generation is defined, and an area not having enough space for installation of the number of modules is also included therein.

In other words, with the conventional string, due to the configuration of detaching a whole string when a power generation amount of even one single module constituting the string is no greater than a predetermined threshold, 26 strings with 260 modules in total are laid in FIG. 3 as a result.

On the other hand, in FIG. 2, since detachment from the module is possible in a unit of the module 7 constituting the module set according to the present Example or in a unit of the cell group 2 constituting the module 7 as described later in FIG. 5, the standard module set $7_n$ can be installed also in regions (seven regions) indicated by the spaces 70 in FIG. 3, for example. Note that, as described above, in the present Example, the cell group with a reduced power generation amount due to failure, an external factor, or an internal factor is ignored or left as is, and not necessarily meant to be electrically detached.

In addition, furthermore, for a space not large enough for installing the standard module set $7_n$, any of one-module set $7_{-1}$ to a nine-module set $7_{-9}$ is used according to the size of the space. The required number of these standard module set and the module sets smaller than the standard module set are prepared in advance on the basis of a construction drawing of the power generation site. Furthermore, an installation procedure for these module sets smaller than the standard module set is also mounted as a construction procedure in conveyance means and an installation crane, as a control program thereof.

The number of modules installed in the field of the power generation site according to the present Example shown in FIG. 2 is 477. To the contrary, in the power generation site in which the same number of modules constitute the string of the prior art in FIG. 3, the number of modules is 260 as mentioned above. By simply comparing these sites, the number of modules in the present Example is 1.83 times greater than the conventional number of modules. In other words, the construction method according to the present Example allows installation of almost twice as many modules as the conventional method. This means that a far greater power generation amount can be obtained from a field of a specific dimension.

FIG. 4 is a schematic view illustrating a configuration of Example of the solar module according to the present invention, in which four solar cells are assembled into a group, and one module 7 is constituted of eighteen groups, six rows by three columns, in total. FIG. 5 is an explanatory view of the cell groups constituting the module, in which each of the cell groups 2 is independent from each other and connected to the in-module parallel connection line 6 via a cell group controller 5. Then, the in-module parallel connection lines 6 from respective columns are concentrated in the optimizer 4, which is connected in parallel to the inter-module parallel connection line 8.

The cell group controller 5 also having a connection/decoupling function monitors a power generation state of the cell 1 in the group, and when it is detected that a power generation amount is lower than a (preset) defined threshold value due to for example a physical failure or reduction in solar radiation reception amount caused by a solar light shielding object 13 such as a foreign object, decouples the group from the in-module parallel connection line 6 (off: ignored or left as is). Note that, when the shielding object such as a foreign object is removed and the solar radiation reception amount is restored and the power generation amount exceeds the threshold value, the cell group is connected again to the in-module parallel connection line 6 (on: contributing to power generation).

Furthermore, the optimizer 4 provided in the module 7 decouples the module 7 itself from the inter-module parallel connection line 8 (same as above) when an overall power generation amount of the module 7 is detected to be no greater than a threshold value due to, for example, breakage of a plurality of cell groups 2 or the shielding objects. The fact of decoupling of the module is transmitted as one of the monitoring/measurement/control signal 9 to the relay terminal (monitoring terminal of the site) 15 together with positional data from the GPS, and the data is transmitted to the server 16 and transferred to the remote terminal 17.

In the remote terminal 17, it is processed with image data from a data center (see reference numeral 42 in FIG. 13) described later, and identification of a failed module is displayed on the monitor 18 by an image or the like.

FIGS. 6(*a*) and 6(*b*) are diagrams illustrating difference of decoupling methods of the solar modules constituting the solar array in a case of an in-module failure, through comparison between the present invention and the prior art. FIG. 6(*a*) shows the module set of the present Example, in which when a specific module 7X+1 fails, only the module 7X+1 is decoupled (ignored or left as is) from the in-module parallel connection line 6, and normal modules 7X, 7X+2, . . . 7X+n on both sides thereof continue power generation. In other words, in the present Example, the reduction in power generation amount is limited only to the failed module. When the module 7X+1 generates power somewhat beyond the threshold value, the generated power is effectively utilized.

On the other hand, in the conventional string shown in FIG. 6(*b*), all modules constituting the string are connected in series to an in-module serial connection line 61. Therefore, when a specific module 7X+1 fails, not only the module 7X+1, but also all modules 7X, 7X+2, . . . 7X+n on both sides thereof are (electrically) decoupled. In other words, a failure of only one module results in loss of power generation from an entire string to which the module belongs.

FIGS. 7(*a*) and 7(*b*) are schematic views illustrating difference of decoupling methods of the solar modules constituting the solar array in a case of reduction in reception amount of solar light, through comparison between the present invention and the prior art. FIG. 7(*a*) shows the module set of the present Example, in which when a plurality of modules 7X are shielded by the shielding objects 38 and the power generation amount is less than the predetermined threshold value, the plurality of modules 7X are decoupled (ignored or left as is) from the in-module parallel connection line 6. As a result, the modules 7X+1, 7X+2, . . . 7X+n are capable of continuing power generation. In other words, in the present Example, power generation can be continued with modules other than the modules with the power generation amount less than the predetermined threshold value.

On the other hand, in the conventional string shown in FIG. 7(*b*), since all modules constituting the string are connected in series to the in-module serial connection line 61, even when only one module in the string is shielded by the shielding objects 38 and the power generation amount is less than the predetermined threshold value, the whole string is decoupled from the in-module serial connection line 61. In other words, reduction in power generation amount in only one module constituting the string results in loss of power generation from an entire string to which the module belongs.

FIG. 8 is a back view of a major part illustrating an example of a sensor interface in the solar module according to the present invention. In the module 7 according to the present Example, a plurality of cells are integrally fixed with a frame 71. The optimizer 4 is attached to a part of a back face of the frame 71. In addition, a sensor group 20 is installed in an appropriate position on the frame 71 of the module. The sensor group includes a tilt sensor, a direction sensor, an insolation amount sensor (illuminance sensor), a humidity sensor, a temperature sensor, an atmospheric pressure sensor, and a vibration sensor. The GPS also belongs to the sensor group. Output data from respective sensors is multiplexed in the optimizer 4, superposed on the inter-module connection line 8 and transmitted to the junction box 39, and transferred to the relay terminal 15 (FIGS. 1(*a*) and 1(*b*)).

The optimizer 4 boosts low-voltage power (for example, 40 V) taken from its own cell from the in-module parallel connection line 6 (see FIG. 4 mentioned above and the like) to high voltage (in this case, 800 V) for a conversion process in the power conditioner 14 (see FIGS. 1(*a*) and 1(*b*)), and feeds to the inter-module parallel connection line 8.

FIG. 9 is a back view of a major part illustrating another example of the optimizer in the solar module according to the present invention. In this configuration example, the terminal box 19 is accommodated in a housing of the optimizer 4, and a back face structure of the frame 71 of the module is simplified. Note that the sensor group 20 may also be partially or entirely accommodated in the housing of the optimizer 4. This allows further simplification of structure of the module and can contribute to streamlining of construction.

FIG. 10 is an explanatory view of an example of a solar light reception mode of the solar modules, being a schematic view illustrating influence of a change in direct insolation amount and the shielding objects with respect to the solar array and an installation mode thereof. In FIG. 10, a solar array 10 is installed on a cradle 36 provided in the field of the power generation site 35. In FIG. 10, basically, the solar array 10 is installed with respect to the ground surface with an installation direction S and an installation angle D in the latitude direction. The field 35 is not necessarily planar and is typically irregular ground with irregularity and rolling, and illuminance of a sun-oriented face may vary between the solar array 10 and respective solar module sets ($7_{-1}$, $7_{-n}$, $7_{-S}$). Data of a position of the installation place (location data) L can be easily identified by the GPS. The position of each solar array 10, and each module 7 can also be identified.

In addition, a received light amount of solar radiation is also influenced by the shielding objects 12, the foreign object, and the like. For the solar array 10 or each of the solar module sets ($7_{-1}$, $7_{-n}$, $7_{-S}$), by randomly setting an angle of incidence $\phi$ to any of east, west, south, and north or a plurality of directions, the change in insolation amount due to movement of the sun with respect to the power generation amount can be alleviated. In addition, concentration of reflected light from the modules to a specific direction due to the uniform tilt angle of the modules can be avoided.

FIG. 11 is a diagram illustrating change in output of the solar modules during a day through comparison between the present invention and the prior art. As described above, by keeping the generated voltage of the solar cell group 2 (for example, 40 V in this case) constant, catch-up of output with illuminance of the sun becomes faster and more refined, enabling the optimal and greatest output even in unstable weather. Then, by boosting voltage to 800 V, for example, for each solar module, and feeding to the grid line, the optimal and greatest output can be obtained.

By maintaining the voltage constant, even when solar-generated power output (PV: photovoltaic power) of the solar module is low, for example in the morning and evening, on cloudy days, etc., fine control of power generation output in ascending and descending portions of an output characteristic curve is enabled as shown by the curve in FIG. 11, thus suppressing loss in the low-output state. As an example, supposing that the sun rises at 6:00 and the sun sets at 18:00, the duration during which the power generation output can be taken by the conventional method is 9 hours as shown in the stepped shape in the drawing. To the contrary, the duration is 12 hours with the solar module of the present Example.

FIG. 12 is a block diagram illustrating a configuration example with regard to the optimizer of the solar module according to the present invention. The configuration with regard to the optimizer 4 in the present Example is merely an example, and various modifications can be made with means for realizing the AI function. In FIG. 12, the optimizer 4 includes: positional data acquisition means 27 by means of the GPS that calculates and acquires positional data of the solar module on the basis of a signal received by a GPS antenna 21; and sunrise/sunset time acquisition means 28 that calculates and determines sunrise/sunset time with reference to a direct insolation amount sensor (so-called brightness sensor) 22 and a calendar table 23.

In addition, there are provided: solar light incident angle acquisition means 29 that calculates and acquires an angle of incidence of solar light on the basis of latitude data of the field stored in the latitude table 24, the calendar table 23, and detection data from the tilt sensor 26; and installation direction/installation angle acquisition means 30 that calculates and acquires installation direction/installation angle of the solar module on the basis of data from the direction sensor (compass) 25 and the detection data from the tilt sensor 26.

In addition, the optimizer 4 includes AI function execution means 31. The AI function execution means 31 estimates, determines, and learns environmental data around the solar module such as a duration of shielding by the shielding objects, trend of solar radiation reception amount, and trend of weather condition, from calculation results from the positional data acquisition means 27, the sunrise/sunset time acquisition means 28, the solar light incident angle acquisition means 29, and the installation direction/installation angle acquisition means 30, as well as humidity, temperature, atmospheric pressure, and acceleration (vibration) sensors. From the learning result, data is generated for managing the solar cell group and the solar modules, carrying out maintenance, and the like.

Furthermore, output from the AI function execution means 31 is connected to the optimizer 4, and used as a control signal for a solar module detachment switch 5. A clock 34 supplies standard clock data of the power generation site to a microchip 3 mounted with the AI function execution means 31. Note that, an alternative configuration is possible in which determination means (software, for example, RPA: Robotic Process Automation) that follows a procedure defined in advance is provided in place of the AI function execution means 31, and output thereof is supplied to the optimizer 4.

The optimizer 4 includes a monitor 32 that monitors operation of the AI function execution means 31 or the determination means. The monitor 32 for monitoring is provided with correction means 33 that carries out correction when determination by the AI function is, or is suspected to be, non-realistic from the viewpoint of human sense, or when the determination means is determined to be obviously wrong. As a result, the AI is always under the supervision of human, thus enabling shortening of a learning step and improvement of efficiency of learning. The same applies to the determination means. The monitor 32 and the correction means 33 can be installed in the remote terminal 17 shown in FIG. 1(*a*).

Note that the present invention is not limited to the above-described configuration, and it is obvious that various modifications can be made within the scope of the technical spirit of the present invention.

FIG. 13 is a schematic view illustrating an entire image of an example of a monitoring system of the power generation site according to the present invention. Generated power of the solar array 10 installed in the field of the power generation site 35 is output from the power conditioner 14 to the grid line. On the other hand, various data measured by the sensors of the solar array 10, and signals for management and control are transmitted to the server 16 via the in-module parallel connection line (6 in FIG. 1(*a*)), the inter-module parallel connection line 8, and the relay terminal, and then transferred to the remote terminal 17.

An image of the solar array 10 in the field of the power generation site 35 is captured by the satellite 40, and the captured image of the solar array 10 is transferred and stored in the data center 42 via a receiving station. Note that it is obvious that the image of the solar array 10 may also be captured by means such as a drone 43.

The satellite 40, the drone 43 and the like capture, in addition to visible images (still image and video), various images such as a thermo image and spectroscopy data as necessary, and the images are transferred and stored in the data center 42.

Note that the remote terminal 17 analyzes various types of measured data and management signals from the server 16, and uses image data stored in the data center 42 to identify the module 70 being detached due to degradation in power generation performance. The module 70 thus identified is displayed on a monitor 18 of the remote terminal 17. In this display, warning can be issued by, for example, red colored light/blinking indication on a screen.

On the monitor 18 of the remote terminal 17, the power generation state of each solar module can be displayed on a time axis, or in a format of daily report, monthly report, or the like, as a normal operation status.

FIG. 14 is a schematic view illustrating an example of an image of a monitoring monitor terminal in an example of the monitoring system of the power generation site according to the present invention. In FIG. 14, the monitor 18 is configured to be able to display the solar module identified as described above, and information necessary for running the power generation site such as various types of measured data.

The present Example enables efficient management, from a remote location, of the power generation site under the supervision. Note that transmission of various types of data measured by the sensors, and signals for management and control is not limited to transmission via the PCL line and the communication line, and other wired and wireless transmission means can also be used.

As described in the foregoing, the present Example enables: monitoring of the power generation operation status of the solar power generation system, respective constitutive solar modules thereof, or respective solar cells with a remote value; real-time identification of the failed solar module; simplification of management tasks including maintenance; increase in efficiency of management resource; and the like, leading to a large reduction in the management cost for a large-scale solar power generation site.

REFERENCE SIGNS LIST

1 Solar cell
2 Solar cell group
4 Optimizer
5 Cell group controller
6 In-module parallel connection line (module generated power output conveyance communication line)
61 In-module serial connection line
7 Solar module
7-1 One-module set
7-$n$ n-module set
7-S Standard module set
8 Inter-solar-module connection line (generated power output line)
9 Monitoring/measurement/control signal
10 Solar array
11 Sun
12 Shielding object
13 Foreign object
14 Power conditioner
15 Relay terminal
16 Server
17 Remote terminal
18 Remote monitor
19 Terminal box
20 Sensor group
21 GPS antenna
22 Direct solar radiation reception amount sensor
23 Calendar data table
24 Latitude table
25 Direction sensor
26 Tilt sensor
31 AI
32 Monitor (monitor of server 16)
33 Corrected input means
34 Clock
35 Field of power generation site
36 Cradle
37 Network (e.g., Internet)
38 Shielding object
39 Junction box
40 Satellite
44 Receiving station 42 Data center
43 Drone
71 Frame

The invention claimed is:

1. A solar module comprising:
a plurality of solar cell groups, each comprising a plurality of solar cells,
an in-module parallel connection line connecting the plurality of solar cell groups,
cell group controllers, each being connected to each of the solar cell groups and monitoring a power generation state of the solar cells in one solar cell group, each cell group controller having a switch for decoupling the one cell group from the in-module parallel connection line upon detection of a power generation amount falling below a preset value,
an optimizer connected to the cell group controllers through the in-module parallel connection line and including a boost circuit that boosts generated voltage being input from the solar cell groups via the in-module parallel connection line and outputs to an inter-solar module parallel connection line, wherein the optimizer monitors the power generation state of the cell group controllers and has a switch for decoupling outputs of the cell group controllers from the in-module parallel connection line to the inter-solar module parallel connection line upon detection of a power generation amount of the solar cell groups falling below a preset value, and
a junction box to which monitoring, measurement and control signals of each module transmitted from the optimizer together with power are transmitted, wherein the power is output to a grid line and the signals are output to a relay terminal, wherein
the optimizer is configured to, in response to decoupling the outputs of the cell group controllers, transmit the monitoring, measurement and control signals to the relay terminal with positional data from Global Position System (GPS) to identify a position of the optimizer where the outputs of cell group controllers were decoupled.

2. The solar module according to claim 1, wherein the solar module further comprises, in addition to a GPS antenna configured to receive the positional data from the GPS, a direct solar radiation reception amount sensor, a calendar data table, a latitude table, a direction sensor, and a tilt sensor, an environmental sensor including a temperature sensor, a humidity sensor, a wind direction/wind force sensor, an atmospheric pressure sensor, and a vibration sensor, and carries out transmission and reception of information of monitoring and control by the cell group controller of a status of a power generation site on the basis of the various sensors and obtained data, to and from a monitoring center via the inter-module parallel connection line and a grid line.

* * * * *